United States Patent [19]

McNeill et al.

[11] Patent Number: 4,863,290

[45] Date of Patent: Sep. 5, 1989

[54] COMBINED SHIFT ROD BUSHING AND GEAR CASE SEAL FOR MARINE PROPULSION DEVICE

[75] Inventors: Steven R. McNeill, Waukegan; Scott N. Burmeister, Gurnee; Matthew H. Mondek, Wonder Lake; Roger B. Whipple, Grayslake, all of Ill.

[73] Assignee: Outboard Marine Corporation, Waukegan, Ill.

[21] Appl. No.: 184,339

[22] Filed: Apr. 21, 1988

[51] Int. Cl.$^4$ .............................................. F16C 33/72
[52] U.S. Cl. ...................... 384/130; 384/16; 384/152; 384/904
[58] Field of Search ........ 384/129, 130, 138, 151–153, 384/215, 220, 226, 428, 438, 439, 15, 16, 26, 29, 37, 41, 904

[56] References Cited

U.S. PATENT DOCUMENTS

| | | | |
|---|---|---|---|
| 2,635,931 | 4/1953 | May ............................... | 384/152 |
| 2,973,997 | 3/1961 | Kirkland ........................ | 384/138 |
| 3,776,611 | 12/1973 | Jentsch ......................... | 384/152 |
| 3,791,495 | 2/1974 | Keijzer et al. ............... | 384/16 X |

Primary Examiner—Thomas R. Hannon
Attorney, Agent, or Firm—Michael, Best & Friedrich

[57] ABSTRACT

A marine propulsion lower unit including a gear case supporting a propeller shaft adapted to carry a propeller, which gear case has an upper surface including therein a cylindrical well defined by cylindrical peripheral wall and a bottom wall having therein an axial bore, a combined shift rod bushing and gear case seal assembly comprising a hub having an axis and axially spaced first and second ends, which hub also includes therein an axial bore extending from the first end, and which hub also includes therein a counter bore extending from the second end, and communicating with the axial bore in coaxial relation thereto, a flange extending from the hub and received in the well in the gear case, a pair of attachment arms extending from the hub in transverse radially outward relation to the axis of the hub and fixedly connected to the gear case, a plug member received in the counter bore and having an axial bore communicating with the axial bore in the hub, a shift rod extending through the axial bore in the plug member and through the axial bore in the hub, a first seal between the flange and the gear case, and a second seal between the plug member and each of the hub and the shift rod.

4 Claims, 1 Drawing Sheet

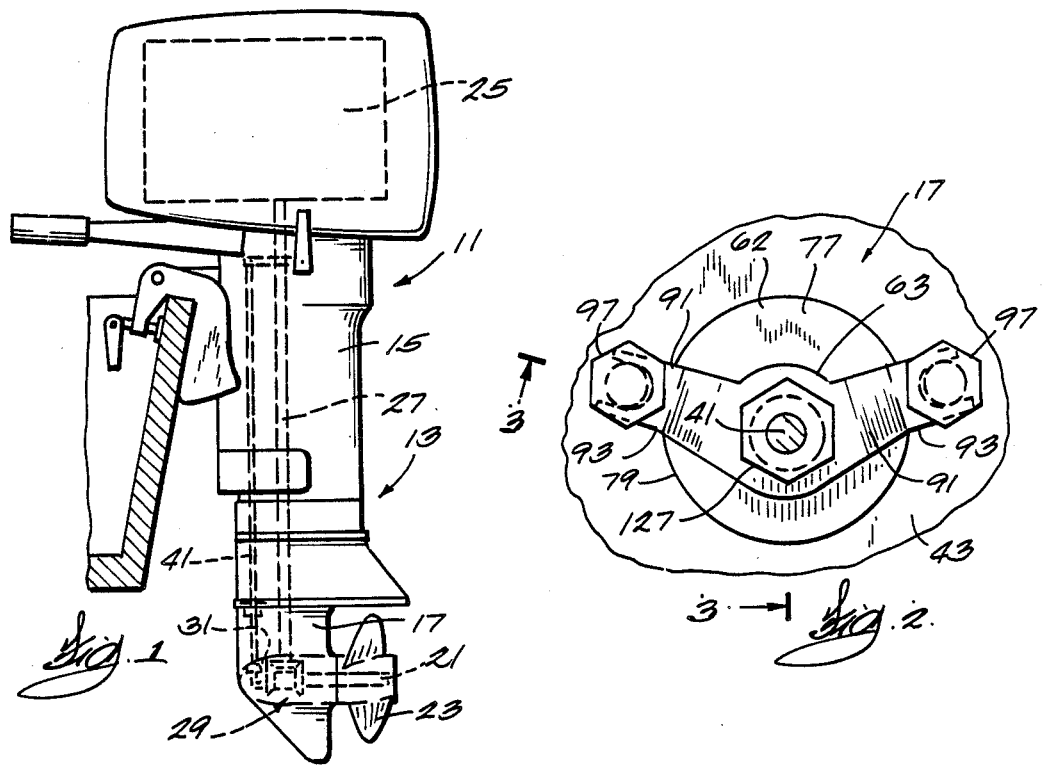
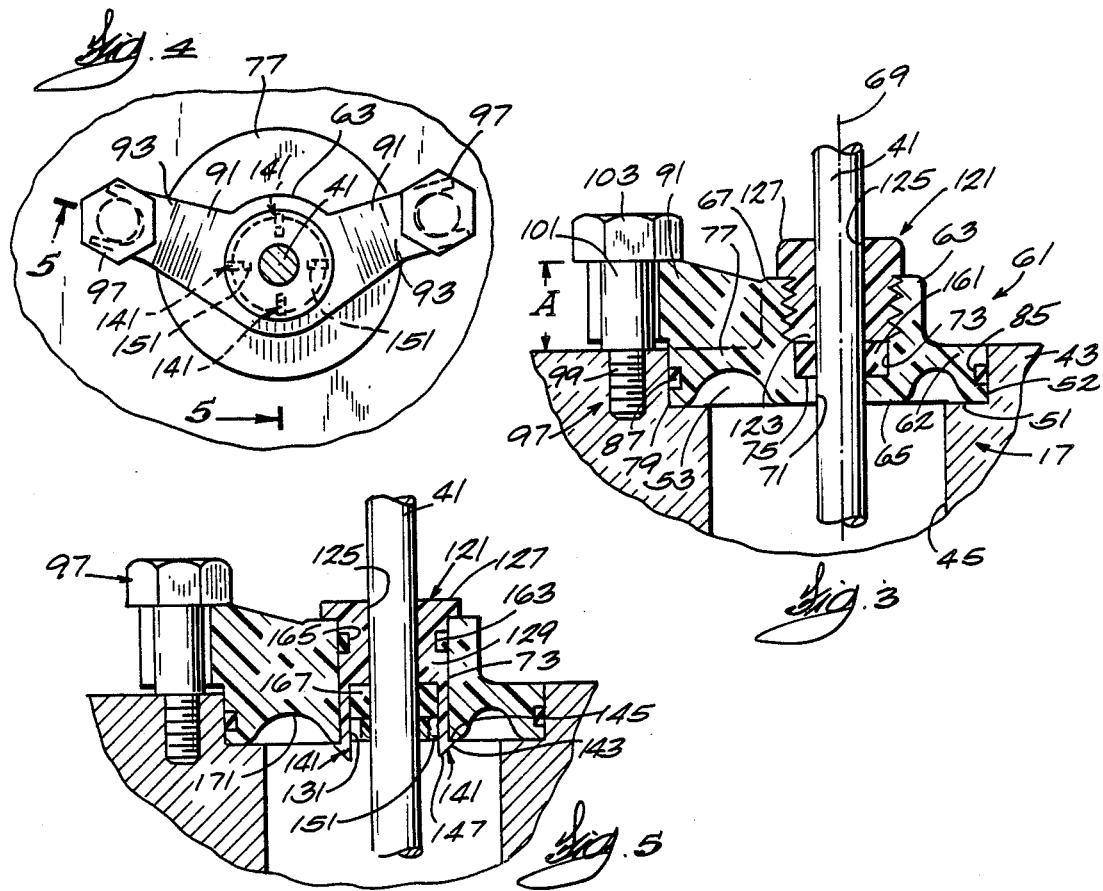

COMBINED SHIFT ROD BUSHING AND GEAR CASE SEAL FOR MARINE PROPULSION DEVICE

BACKGROUND OF THE INVENTION

The invention relates generally to marine propulsion devices including a gear case having an interior cavity containing a propeller shaft, a reversing transmission, and lubricant. Such reversing transmissions are commonly actuated by a shift rod which is axially or rotatably movable, which is suitably connected to the reversing transmission, and which passes through a seal to the lubricant filled cavity. In the past, a bushing assembly including a brass bushing has been typically employed, which bushing assembly was secured to the gear case with four screws in order to insure sealing of a flat gasket between the upper surface of the gear case and a lower surface of the bushing assembly. While the design was functional, it was also corrosive because of the closeness of the aluminum gear case and the brass bushing. Such corrosive tendency often made replacement quite difficult. In addition, the bushing assembly was relatively expensive.

SUMMARY OF THE INVENTION

The invention provides a marine propulsion lower unit including a gear case supporting a propeller shaft adapted to carry a propeller, together with a combined shift rod bushing and gear case seal assembly comprising a member including an axis and axially spaced first and second ends, which member also includes therein an axial bore extending from the first end, and which member also includes therein a counter bore extending from the second end, and communicating with the axial bore in coaxial relation thereto, attachment means extending from the member in transverse radially outward relation to the axis and fixedly connected to the gear case, a plug member received in the counter bore and having an axial bore communicating with the axial bore in the member, a shift rod extending through the axial bore in the plug member and through the axial bore in the member, first seal means between the member and the gear case, and second seal means between the plug member and each of the member and the shift rod.

The invention also provides a combined shift rod bushing and gear case seal assembly comprising a member including an axis and axially spaced first and second ends, which member also includes therein an axial bore extending from the first end, which member also includes therein a counter bore extending from the second end, and communicating with the axial bore in coaxial relation thereto, attachment means extending from the member in transverse radially outward relation to the axis for affording attachment to a support, and a plug member received in the counter bore and having an axial bore communicating with the axial bore in the member.

The invention also provides a combined shift rod bushing and gear case seal assembly comprising a main body comprising a hub including an axis and axially spaced first and second ends, which hub also includes therein an axial bore extending from the first end, which hub also includes therein a counter bore extending from the second end, communicating with the axial bore in coaxial relation thereto, and having a bottom, a flange extending from the hub in axially spaced relation from the second end and in radially outward and transverse relation to the hub and including an outer annular surface having therein an annular peripheral groove, and an attachment arm extending from the hub in axially adjacent relation to the flange and in transverse radially outward relation to the axis, which arm has an outer end portion which is U-shaped and outwardly open in a plane extending transversely to the axis, a plug member received in the counter bore and having an inner end and an axial bore communicating with the axial bore in the hub, a first seal located in the counter bore between the inner end of the plug member and the bottom of the counter bore, and a second seal located in the peripheral groove in the flange.

The invention also provides a combined shift rod bushing and gear case seal assembly comprising a main body including a hub having an axis and axially spaced first and second ends, which hub also includes an axial bore extending from the first end and a counter bore extending from the second end, having a bottom, and communicating with the axial bore in coaxial relation thereto, a flange extending from the hub intermediate the first and second ends thereof and in radially outward and transverse relation to the axis, which flange has an outer annular surface having therein an annular peripheral groove, an attachment arm extending from the hub and in transverse radially outward relation to the axis, which arm is U-shaped and outwardly open in a plane extending transversely to the axis, a plug member having an inner end received in the counter bore and having an axial bore communicating with the axial bore in the hub, a first seal located in the counter bore between the inner end of the plug member and the bottom of the counter bore, and a second seal located in the peripheral groove in the flange.

Other features and advantages of the invention will become apparent to those skilled in the art upon review of the following detailed description, claims, and drawings.

FIG. 1 is a side elevational view, partially in section, of a marine propulsion device incorporating various of the features of the invention.

FIG. 2 is an enlarged top view, partially in section, of one embodiment of a portion of the marine propulsion device shown in FIG. 1.

FIG. 3 is a sectional view taken along line 3—3 of FIG. 2.

FIG. 4 is a view similar to FIG. 2 and illustrating a second embodiment of a portion of the marine propulsion device shown in FIG. 1.

FIG. 5 is a sectional view taken along line 5—5 of FIG. 4.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in FIG. 1 is an outboard motor 11 comprising a lower unit 13 including a drive shaft housing 15 and a gear case 17 connected to the lower end of the drive shaft housing 15. Both the drive shaft housing 15 the and the gear case 17 are conventionally formed of aluminum.

The gear case 17 supports a propeller shaft 21 which carries thereon a propeller 23 and which is driven from an engine 25 through a drive shaft 27 connected to the propeller shaft 21 by a reversing transmission 29. The propeller shaft 21 is partially located within, and the reversing transmission 29 is located within, a sealed cavity 31 within the gear case 17, which cavity 31 normally contains a quantity of lubricant and is sealed against entry of water.

The reversing transmission 29 includes means well known in the art for effecting operation of the reversing transmission 29 between neutral and drive conditions and comprises a shift rod 41 which extends through the drive shaft housing 15 and into the gear case 17 and which can be either axially movable or rotatably movable to effect shifting operation of the reversing transmission 29.

More particularly, as shown here in FIG. 3, the sealed cavity 31 is formed in the gear case 17, in part, by an upper wall 43 having therein an opening 45 for travel therethrough of the shift rod 41. The shift rod opening 45 is counter bored at the upper surface of the upper wall 43 to define a peripheral cylindrical wall 52 and an annular ledge 51 providing a well 53. Located in the well 53 is a combined shift rod and gear case seal assembly 61 which surrounds the shift rod 41, which affords shift rod movement relative thereto to actuate the reversing transmission 29, and which seals the gear case 17 from the entry of water and from discharge of lubricant.

More particularly, the combined shift rod bushing and gear case seal assembly 61 includes a main portion or member 62 comprising a central hub 63 including a first or lower end 65 and a second or upper end 67. The hub 63 can take various forms, and in the disclosed construction, the hub 63 is generally cylindrical and includes a vertical axis 69 extending between the lower and upper ends 65 or 67.

The hub 63 includes an axial bore 71 which extends through the lower end 65 and through which the shift rod 41 extends. The hub 63 also includes a counter bore 73 which extends from the upper end 67, which communicates with the axial bore 71 in coaxial relation thereto, which includes a bottom wall 75 extending from the axial bore 71, and through which the shift rod 41 also extends.

Extending radially outwardly of the hub 71 is a mounting web, disc, or flange 77 which can take various forms and which is received in the well 53 in the upper surface of the gear case wall 43. In the disclosed construction, the web or flange 77 is generally cylindrical in shape with the axis thereof in parallel and somewhat offset relation to the axis 69 of the hub 63. The web or flange 77 includes a peripheral cylindrical outer surface 79.

Means are provided for effecting a seal between the cylindrical wall 52 of the wall 53 in the gear case 17 and the outer surface 79 of the web or flange 77 of the hub 63 of the combined shaft rod bushing and gear case seal assembly 61. While other constructions can be employed, in the disclosed construction, such means comprises an annular groove 85 in the cylindrical outer surface 79 and a sealing or O-ring 87 which is of rubber or rubber-like material and which is located in the groove 85 for sealing engagement between the gear case 17 and the combined shift rod bushing and gear case seal assembly 61 to prevent loss of lubricant from the gear case cavity 31 and to prevent entry of water into the gear case cavity 31.

Means are also provided for fixedly attaching the combined shift rod bushing and gear case seal assembly 61 to the upper wall 43 of the gear case 17. While other constructions can be employed, in the disclosed construction, such means includes a pair of arms 91 which extend radially beyond the peripheral outer surface 79 of the web 77 and at an angle to each other of about 150°. The arms 91 extend axially of the hub 63 from the web 77 to the upper 67 of the hub 63 and each of the arms has an outer end 93 which, in a radial plane perpendicular to the axis 69, is U-shaped in cross section and is radially outwardly open. The axial length or height of the arms 91 at their outer ends 93 is generally constant and is indicated at A in FIG. 3. The attachment means also includes, for each arm 91, an aluminum screw 97 which has an outer end 99 threadingly engaged into an aligned threaded bore in the aluminum gear case 17, a non-threaded cylindrical section 101 with a length slightly less than the axial length A of the ends 93 of the arms 91, and a suitable enlarged head 103. As a consequence, the screws 87 can be tightly engaged in the gear case 17 without adversely deforming the hub 63 and web or flange 77 of the combined shift rod bushing and gear case seal assembly 61. The use of aluminum screws 97 in the aluminum gear case 17 serves to reduce or eliminate corrosion.

The hub 63, web 77, and arms 91 form the main portion or member 62 of the combined shift rod bushing and gear case seal assembly 61 and are preferably formed as an integral plastic piece which, of course, is non-corrosive and, accordingly, can be readily removed for replacement if desired.

The combined shift rod bushing and gear case seal assembly 61 also includes a plug member 121 which is also preferably formed of the same plastic as the member 62, which has an inner end 123 located in the counter bore 73 and which has an axial bore 125 through which the shift rod 41 extends. In addition, the plug member 121 has an enlarged head 127 located exteriorly of the counter bore 73.

Means are provided on the plug member 121 and on the hub 63 for retaining the plug member 121 and hub 63 in assembled relation. Various arrangements can be employed. In the embodiment shown in FIGS. 2 and 3, such means comprises mating threads on the plug member 121 and in the counter bore 73 permitting the plug member 121 to be screwed into the counter bore 73. In this embodiment, the head 127 is multi-sided to permit engagement by a wrench (not shown) to tighten the plug member 121 into the hub 63.

In the embodiment shown in FIGS. 4 and 5, the plug member 121 includes, adjacent to the head 127, a cylindrical portion 129 which has a close fit within the counter bore 73. The plug member 121 also includes, at the inner end of the cylindrical portion 129, a counter bore 131 communicating with the axial bore 125 and open toward the inner end.

As in the embodiment shown in FIGS. 4 and 5, means are provided for connecting the plug member 121 to the hub 63. In the embodiment shown in FIGS. 4 and 5, such means comprises a series of angularly spaced fingers 141 which extend axially from the inner end of the cylindrical portion 129 and which include, at their outer ends, respective hooks 143 having a transverse or hooking surface 145 perpendicular to the axis of the plug member 123 and an inclined caming surface 147 which inclines outwardly and toward the head 127. In addition, such means comprises a like series of slots 151 in the bottom wall 75 of the counter bore 73. During axially inward insertion of the plug member 123 into the counter bore 73, the camming surfaces 147 are received in the slots 151 and, as the plug member 121 is forcefully axially displaced into the counter bore 73, such movement forces the hooks 143 radially inwardly, which movement is facilitated by the resilience in the fingers 141. When the hooks 143 pass through the slots 151, the fingers 141 move resiliently outwardly to locate the hooking surfaces 145 against the backside of the bottom wall 75, thereby preventing axial outward disassembly of the plug member 121 from the hub 63.

Means are also provided for sealing the plug member 121 to each of the hub 63 and the shift rod 41. Various arrangements can be employed.

In the embodiment shown in FIGS. 2 and 3, such means comprises a single sealing or O-ring 161 of rubber or rubber-like material and located in the space between the bottom wall 75 of the counter bore 73 and the inner end 123 of the plug member 121 and in sealing engagement with the hub 63, with the plug member 121, and with the shift rod 41.

In the embodiment shown in FIGS. 4 and 5, a first sealing or O-ring 163 of rubber or rubber-like material is located in an annular peripheral groove 165 in the cylindrical portion 129 of the plug member 121 and seals between the hub 63 and the plug member 121. In addition, another O-ring 167 of rubber or rubber like material is located in the axial counter bore 131 in the plug member 121 and seals between the plug member 121 and the shift rod 41.

The annular recess indicated at 171 is primarily provided to reduce the quantity of plastic material and to lessen the weight of the combined shift rod bushing and gear case seal assembly 61, without diminishing structural strength.

The described shift rod bushing and gear case seal assembly 61 permits either axial or rotary movement of the shift rod 41 to actuate the transmission 29 in the gear case 17, while at the same time, maintains the sealed integrity of the cavity 31 in the gear case 17, i.e., keeps out water and keeps in lubricant. In addition, the disclosed construction is more economical than previous constructions and is easy to replace if desired because of the absence of the use of dissimilar metals in closely adjacent relationship, which was, in the wet environment, corrosive.

It is also noted that, as distinguished from the prior art, the sealing function and the attaching function are independent of each other. In this regard, in the prior art, four screws were employed to retain the members tightly against the sealing gasket. In the disclosed construction, only two screws are employed and they do not directly contribute to the seal between the gear case 17 and the member 62.

Various of the features of the invention are set forth in the following claims:

We claim:

1. A marine propulsion lower unit including a gear case supporting a propeller shaft adapted to carry a propeller, a combined shift rod bushing and gear case seal assembly comprising a member including an axis and axially spaced first and second ends, said member also including therein an axial bore extending from said first end, and said member also including therein a counter bore extending from said second end, and communicating with said axial bore in coaxial relation thereto, attachment means extending from said member in transverse radially outward relation to said axis and fixedly connected to said gear case, a plug member received in said counter bore and having an axial bore communicating with said axial bore in said member, a shift rod extending through said axial bore in said plug member and through said axial bore in said member, first seal means between said member and said gear case, and second seal means between said plug member and said each of member and said shift rod.

2. A combined shift rod bushing and gear case seal assembly comprising a member including an axis and axially spaced first and second ends, said member also including therein an axial bore extending from said first end, said member also including therein a counter bore extending from said second end, and communicating with said axial bore in coaxial relation thereto, attachment means extending from said member in transverse radially outward relation to said axis for affording attachment to a support, and a plug member received in said counter bore and having an axial bore communicating with said axial bore in said member.

3. A combined shift rod bushing and gear case seal assembly comprising a main body comprising a hub including an axis and axially spaced first and second ends, said hub also including therein an axial bore extending from said first end, said hub also including therein a counter bore extending from said second end, communicating with said bore in coaxial relation thereto, and having a bottom, a flange extending from said hub in axially spaced relation from said second end and in radially outward and transverse relation to said hub and including an outer annular surface having therein an annular peripheral groove, and an attachment arm extending from said hub in axially adjacent relation to said flange and in transverse radially outward relation to said axis, said arm having an outer end portion which is U-shaped and outwardly open in a plane extending transversely to said axis, a plug member received in said counter bore and having an inner end and an axial bore communicating with said axial bore in said hub, a first seal located in said counter bore between said inner end of said plug member and said bottom of said counter bore, and a second seal located in said peripheral groove in said flange.

4. A combined shift rod bushing and gear case seal assembly comprising a main body including a hub having an axis and axially spaced first and second ends, said hub also including an axial bore extending from said first end and a counter bore extending from said second end, having a bottom, and communicating with said axial bore in coaxial relation thereto, a flange extending from said hub intermediate said first and second ends thereof and in radially outward and transverse relation to said axis, said flange having an outer annular surface having therein an annular peripheral groove, and an attachment arm extending from said hub and in transverse radially outward relation to said axis, said arm having an outer end portion which is U-shaped and outwardly open in a plane extending transversely to said axis, a plug member having an inner end received in said counter bore and having an axial bore communicating with said axial bore in said hub, a first seal located in said counter bore between said inner end of said plug member and said bottom of said counter bore, and a second seal located in said peripheral groove in said flange.

* * * * *